United States Patent [19]

Young

[11] Patent Number: 5,768,147
[45] Date of Patent: Jun. 16, 1998

[54] METHOD AND APPARATUS FOR DETERMINING THE VOLTAGE REQUIREMENTS OF A REMOVABLE SYSTEM RESOURCE

[75] Inventor: Bruce Young, Tigard, Oreg.

[73] Assignee: Intel Corporation, Santa Clara, Calif.

[21] Appl. No.: 409,318

[22] Filed: Mar. 23, 1995

[51] Int. Cl.⁶ .......................... H03K 19/0175; G06F 3/03
[52] U.S. Cl. .................... 364/492; 364/273.2; 439/488; 307/85; 340/687
[58] Field of Search ................... 364/492, 273.2, 364/273, 273.1, 273.3, 273.5, 708.1, 709.1, 709.05, 709.09; 340/825.06, 687; 307/43, 126, 85, 86, 140, 80, 65; 395/750; 235/492, 375, 441; 365/226, 227, 196, 148, 228, 229, 189.03; 200/51.09, 51.12; 361/1; 439/188, 488, 489

[56] References Cited

U.S. PATENT DOCUMENTS

| | | | |
|---|---|---|---|
| 3,699,311 | 10/1972 | Dunbar | 234/61.11 H |
| 4,675,769 | 6/1987 | Marshall et al. | 361/1 |
| 4,695,914 | 9/1987 | Ohsuki et al. | 361/42 |
| 4,755,902 | 7/1988 | Takehashi | 361/1 |
| 5,237,690 | 8/1993 | Bealkowski et al. | 395/700 |
| 5,265,161 | 11/1993 | Rodriquez | 380/23 |
| 5,304,987 | 4/1994 | Brunson et al. | 340/654 |
| 5,440,748 | 8/1995 | Sekine et al. | 395/750 |
| 5,451,933 | 9/1995 | Stricklin et al. | 340/825.06 |
| 5,475,271 | 12/1995 | Shibasaki et al. | 307/31 |
| 5,491,418 | 2/1996 | Alfaro et al. | 324/402 |
| 5,521,586 | 5/1996 | Takeshita | 340/635 |
| 5,526,217 | 6/1996 | Gormley et al. | 361/119 |
| 5,532,945 | 7/1996 | Robinson | 364/707 |
| 5,612,634 | 3/1997 | MacKenna | 326/62 |

Primary Examiner—James P. Trammell
Assistant Examiner—Tony M. Cole
Attorney, Agent, or Firm—Blakely, Sokoloff, Taylor & Zafman

[57] ABSTRACT

A power detection and control unit detects the acceptable power voltage requirements of a removable system resource and either provides the acceptable power voltage to the removable system resource or provides no voltage to the removable system resource if no acceptable power voltage is available. The power detection and control unit has a detection circuitry and a logic circuitry to translate the acceptable power requirement signal into control signals that control the system power supply. In a first embodiment the detection circuitry consists of an A/D converter analog to digital converter, a resistor coupled to a predetermined power supply voltage, a resistor in the removable system resource coupled to ground, and a filtering capacitor coupled to ground. In a second embodiment, the detection circuitry includes a pattern imprinted on the casing of the removable system resource, a wiper circuit for applying onto the pattern and detecting from the pattern a power requirement signal. This power requirement signal is then translated into system power supply control signals as in the first embodiment.

9 Claims, 7 Drawing Sheets

0  0  0

0  0  1

0  1  0

0  1  1

1  0  0

1  0  1

1  1  0

1  1  1

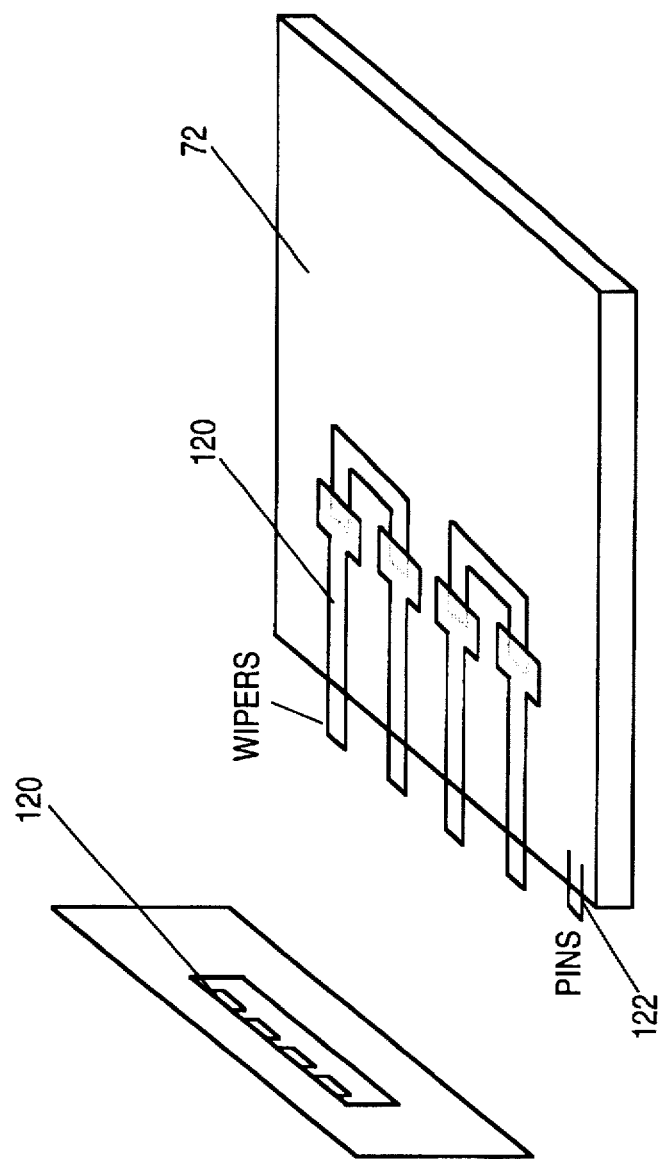

METHOD AND APPARATUS FOR DETERMINING THE VOLTAGE REQUIREMENTS OF A REMOVABLE SYSTEM RESOURCE

BACKGROUND OF THE INVENTION

1. Field of the Invention

The present invention relates to removable system resources, and particularly to a method and apparatus for detecting the power requirements of a removable system resource and either providing an acceptable power voltage to the removable system resource or providing no power voltage to the removable system resource if no acceptable power voltage is available.

2. Art Background

It is becoming increasingly common for computer systems to have removable system resources and special features. These removable resources and features include expansion memory boards (RAM and DRAM), parallel or serial input/output (I/O) ports, read only memory (ROM) or flash memory expansion boards, local area network (LAN) interface cards, modem cards, facsimile (fax) cards, smart cards, small computer system (SCSI) interface cards, or other removable system resources or special feature mechanisms.

For example, it is now quite common for computer systems, notably notebook computer to have a slot into which may be inserted a thin form factor memory cartridge. A "memory cartridge" is a plug-in module containing random access memory (RAM) chips that may be used to store data or programs. Memory cartridges are used primarily in portable computers as smaller, lighter, substitutes for disk drives. Memory cartridges typically use a non-volatile form of RAM which does not lose its contents when power is turned off, or battery-backed RAM which maintains its contents by drawing current from a rechargeable battery within the cartridge.

To encourage the development of these system removable resources, various standards have been established. One such standard was established by the Personal Computer Memory Card International Association (PCMCIA). However, other standards exist; for example, in Japan JEIPA is the equivalent association to PCMCIA.

Many removable system resources and special features are implemented in the prior art using removable electronic feature cards adhering to the PCMCIA, Sunnyvale, Calif., Release 2.0 standard. Currently, there is a Release 2.1 standard. In the near future, there is anticipated to be a CardBus standard.

The PCMCIA PC Card Standard 2.1 outlines the architecture and specifications for an interchangeable integrated circuit card with both data storage ("Memory") and peripheral expansion ("I/O") card types defined. Cards interface through a standard 68-pin connector to operate interchangeably in the same 68-pin slot of a host computer system.

The PCMCIA standard also defines physical specifications for an interchangeable card. For example, PCMCIA specifies that the width and length of a card must be exactly the same size as that of a credit card. Furthermore, the thickness is specified to be 130 thousandths of an inch (3.3 millimeters) along the edge of the card, and the center area of the card is allowed to have a maximum thickness of 197 thousandths of an inch (5 millimeters).

Once inserted, a feature card is accessible to and used by the processor in the computer system. In this way, a computer user achieves the desired level of functionality without being required to purchase unnecessary resources or computer system capabilities.

The overall cost of the computer system for a specific application is thereby optimized. The use of removable feature cards is particularly significant for portable commuters or lap-top computers where space constraints increase the need for system resource optimization. Design and use of hardware devices under the PCMCIA standard are well known in the art. It will be apparent to those skilled in the art that other implementations of removable system resources are possible.

As the industry transitions to lower supply voltages, system designers are faced with a problem of how the removable system resource can inform the host computer system which supply voltages are valid for that system removable resource. The prior art solved this problem in one of two ways, both of which are non-optimal.

First, the most straight forward way for a removable system resource to communicate to the host computer system its acceptable power supply voltages is to dedicate pins on the connector for this specific purpose. For example, a card standard may dedicate a separate card pin for each voltage level supported by the card standard. In other words, a removable system resource would have a number of $V_{CC}$ pins with each $V_{CC}$ pin receiving a different power supply voltage. This solution is non-optimal because it wastefully consumes pins on the system removable resource and the host/system resource adapter.

For example, if the card standard supports four different voltages, at least four pins on the removable system resource must be dedicated to receive those four different voltages and these pins cannot be used for any other purpose. Likewise, at least four corresponding inputs would be taken from the adapter/interface and cannot be used for any other signals.

A second solution to the problem in the prior art is to dedicate a number of pins that represent an encoded field which informs the host computer system which voltages are acceptable to the removable system resource. In this scheme, one code must be reserved for when no system removable resource is inserted. For example, two bits will support at most three different voltages because one code is reserved for the case when no card is inserted. Similarly, three bits would support at most seven voltages. This method is used in the new CardBus standard.

Although this second scheme is better than the first scheme in that it uses fewer bits and corresponding pins than the first scheme, this solution is still not optimal. For example, the new CardBus specification uses four pins on the CardBus card and the corresponding four pins on the adapter/interface the host system. Initially, one would expect 15 different voltages and/or combinations to be represented by a 4 bit field. However, to maintain compatibility with older standards, the number of different voltages effectively represented in the CardBus standard with a 4-bit field is only 8. Since the cost to implement an adapter/interface in an application specific integrated chip (ASIC) is proportional to the number of pins on the integrated chip, a way to minimize the number of pins used on the adapter to control the power supply requirements to a removable system resource is needed.

Thus, there is a need in the prior art to minimize the number of pins/inputs used on the system removable resource and also on host/system removable resource adapter/interface when determining the power requirements of a removable system resource. Moreover, it would be highly preferable that such a method and apparatus for determining the power requirement of a removable system resource to be simple, efficient, cost effective, and flexible enough to anticipate future voltages and changes in removable system resource standards.

SUMMARY OF THE INVENTION

The present invention is a method and apparatus to detect and to provide the power requirements of a system removable resource while only using one input/pin of the removable system resource and one corresponding input/pin of the host system/system resource interface adapter.

In a first embodiment, this power detection and control circuit includes a resistor in a removable system resource that couples a pin/input of the removable system resource to ground. When the removable system resource is inserted and coupled to the host computer system, this resistor, coupled to ground, is also coupled to a pull up resistor to $V_{CC}$, a filtering capacitor to ground, and also to the input of an A/D converter. The resistor, coupled to the input of the removable system resource, in conjunction with the pull up resistor to $V_{CC}$ and the filtering capacitor, located within the host computer system, generate a voltage signal input to the A/D converter. This input is transformed into a corresponding digital signal of n bits which is used as inputs to a logic block. This detection and control circuit further comprises a logic block that is connected to the output of the A/D converter. This logic block creates a number of enable signals to control the power supply of the system. The logic block also generates and sends a signal to the adapter to inform the computer system whether or not the system met the power requirement of the removable system resource.

In a second embodiment, no pins are used on the removable system resource. Instead, the casing, which houses the system removable resource, is used. A pattern is imprinted or stenciled onto the protective casing of the system removable resource. A wiper circuit and latch located within the computer system is used to read a digital value from the pattern. This digital value is then sent as inputs to a logic block. The signals from the latch are then used in conjunction with the logic block to enable the proper voltage power supply and/or send a message to the adapter/interface that the host computer system cannot meet the power requirement of the removable system resource.

These and other aspects of the person invention will become apparent as presented and described in the following description of the preferred embodiment.

BRIEF DESCRIPTION OF THE DRAWINGS

The present invention is illustrated by way of example and not limitation in the figures of the accompanying drawings, in which like references indicate similar elements and in which:

FIG. 7 is an illustration of the power requirement detection and control circuit implemented by wipers that contact the pattern on the protective case of the removable system resource when the removable system resource is coupled to the host/removable system resource adapter.

DETAILED DESCRIPTION OF THE INVENTION

A power requirement detection and control unit is disclosed. In the following detailed specification, to provide a thorough understanding of the present invention, numerous specific details are set forth, such as the configuration of a particular power requirement detection and control unit. It will, however, be apparent to one skilled in the art that the present invention may be practiced without the specific details described herein. In other instances, well known circuit components and computer processing steps have not been described in detail to avoid obscuring the principles of the present invention.

Figure 1:
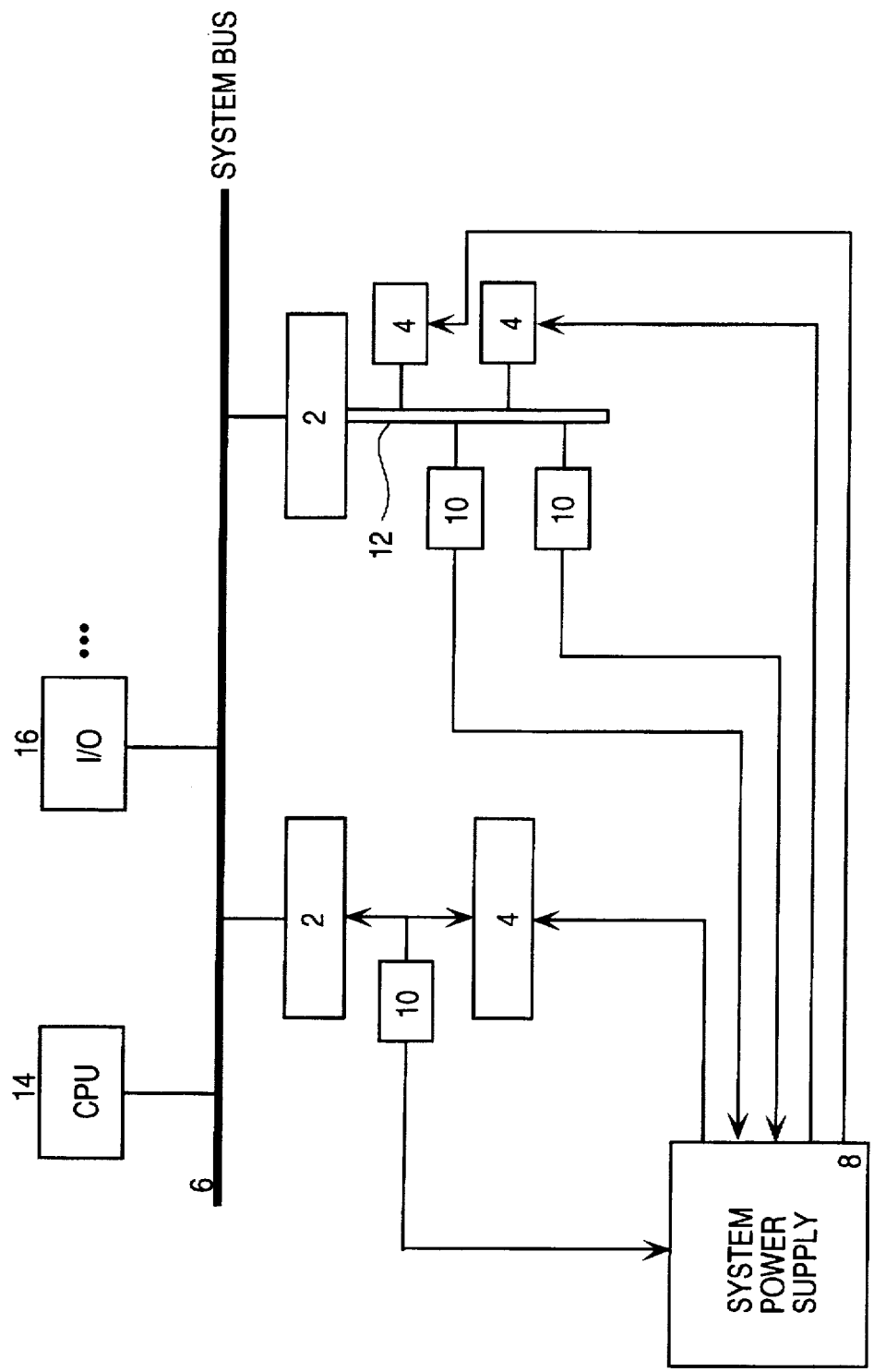
FIG. 1 is a block diagram illustrating the host computer system having a removable system resource and how the present invention fits into such a system.

Referring now to FIGS. 1–7, the various preferred embodiments of the present invention will now be described. FIG. 1 illustrates a host computer system 1 having a host/removable system resource adapter 2 incorporating the power detection and control unit 10 of this invention.

Host computer system 1 includes a CPU 14, a number of I/O devices 16 and a number of host/removable system resource adapters 2, all of which are coupled to the system bus 6. The system power supply 8 is coupled to the host computer system and supplies the power requirements of the host computer system and also all the removable system resources 4. The system power supply 8 may also be distributed with one power supply for each adapter.

Removable system resource 4 is detachably coupled to the host computer system 1 through host/removable system resource adapter 2. The host/removable system resource adapter 2 provides both the physical connection and the logical circuits necessary for the removable system resource 4 to interact and communicate with host computer system 1. For example, adapter 2 may be a PCMCIA socket that includes both the 68-pin physical connector and an ASIC that embodies all necessary interface logic.

The power detection and control unit 10 is coupled to the removable system resource 4. Through one pin/input the power detection/control unit is also coupled to the host/removable system resource adapter 2. If more than one removable system resource 4 is to be connected to one host/removable system resource adapter 2, the power detection and control unit 10 may be coupled to a removable system resource bus 12.

The power detection and control circuit 10 sends an n-bit control signal to the power supply 8. The power detection and control unit 10, its structure and function will be explained in more detail in the discussion of FIG. 2.

As shown in FIG. 1, each host/removable system resource adapter 2 can handle a number of removable system resources. For example, the host/removable system resource adapter 2 can be coupled to a removable system resource bus 12, which can in turn be coupled to a number of removable system resources 4.

Figure 2:
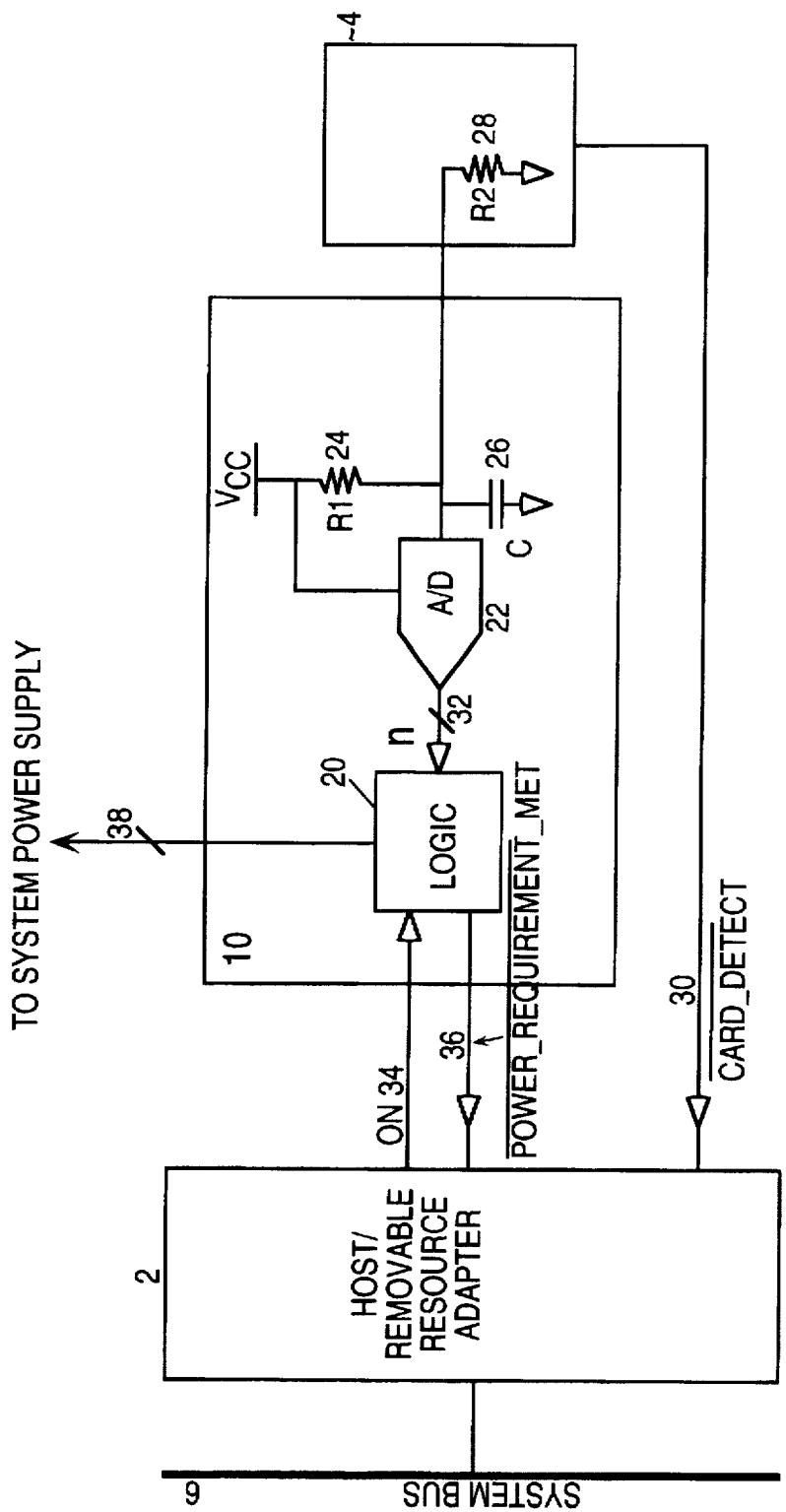
FIG. 2 is a circuit diagram illustrating the power requirement detection and control unit configured in accordance with a preferred embodiment of the invention.

FIG. 2 illustrates the circuit components of the power requirement detection and control unit 10 of one embodiment. Control unit 10 includes an A/D converter 22 whose input is coupled to R1, a pull up resistor 24, C, a filtering capacitor 26 coupled to ground, R2, a resistor that is part of the removable system resource 4, and logic block 20. R2 is coupled to R1 and C when the removable system resource 4 is coupled to the host computer system.

The input of the A/D converter 22 is an analog signal created by the following circuit elements: pull up resistor 24 to $V_{cc}$, filtering capacitor 26 coupled to ground, and the resistor 28 coupled to ground on the removable system resource 4.

Specifically, R1 and R2 establish a voltage divider circuit that sets the input voltage of the A/D converter. By varying the value of R2, while keeping R1 constant, one may generate many different input voltages for the A/D converter. These different input voltages representing analog signals are converted into corresponding digital signals.

The industry may define the values of R2 and the corresponding power voltages acceptable to the removable system resource. However, the industry should define a new value of R2 only if there is an actual industry need for such a new value.

The output of the A/D converter is a digital signal 32 of n bits that are in turn inputs to the logic block 20. Logic block 20 produces a number of power control signals 38 that are sent to the system power supply 8. System power supply 8, and the relationship between the power control signals 38 with the system power supply 8 will be discussed in further detail when describing FIG. 3.

Logic block 20 also sends signal 36 to notify the host/removable system resource adapter 2 whether or not the host computer system was able to meet the power requirements of the removable system resource 4. Logic block 20 also receives the ON signal 34 from the host/removable system resource adapter 2 that indicates to logic block 20 whether or not a system removable system resource has been properly coupled to said host computer system.

The resistor 28 coupled to ground that is part of the removable system resource 4, is connected to a dedicated pin of the removable system resource. This input to the removable system resource cannot be used for any other purpose other than negotiating the power requirement of a system removable resource. When the system removable resource is a PCMCIA card, one could choose to dedicate pin 67 for the purpose of communication to the power requirement detection and control unit 10, the appropriate power requirements of the PCMCIA card. Pin 67 is currently one of the "Card Detect Pins".

However, any input of the system removable resource 4 can be dedicated to perform this power requirement detection, as long as that input is not used for any other purposes, and the industry agrees upon an accepted input to ensure compatibility and uniformity.

Signal 30, the $\overline{Card\_Detect}$ signal, from the removable system resource indicates to the host/system removable resource adapter 2 that the removable system resource 4 (i.e., card) is being coupled to the host computer system. For example, when the PCMCIA card is initially inserted, the host computer system detects pin 36, as defined in the PCMCIA standard. If pin 36 is low, the host computer system waits a few hundred milliseconds to allow time for the card to be fully inserted and then enables logic block 20 by asserting the ON signal 34.

Logic block 20 may be implemented as a state machine or as a simple logic block consisting of basic logic components (i.e., AND/OR gates). In a preferred embodiment, logic block 20 may be implemented as a programmable logic array which implements the appropriate Boolean equations representing the n-bit data signal received from the output of the A/D converter.

Figures 3A, 3B:
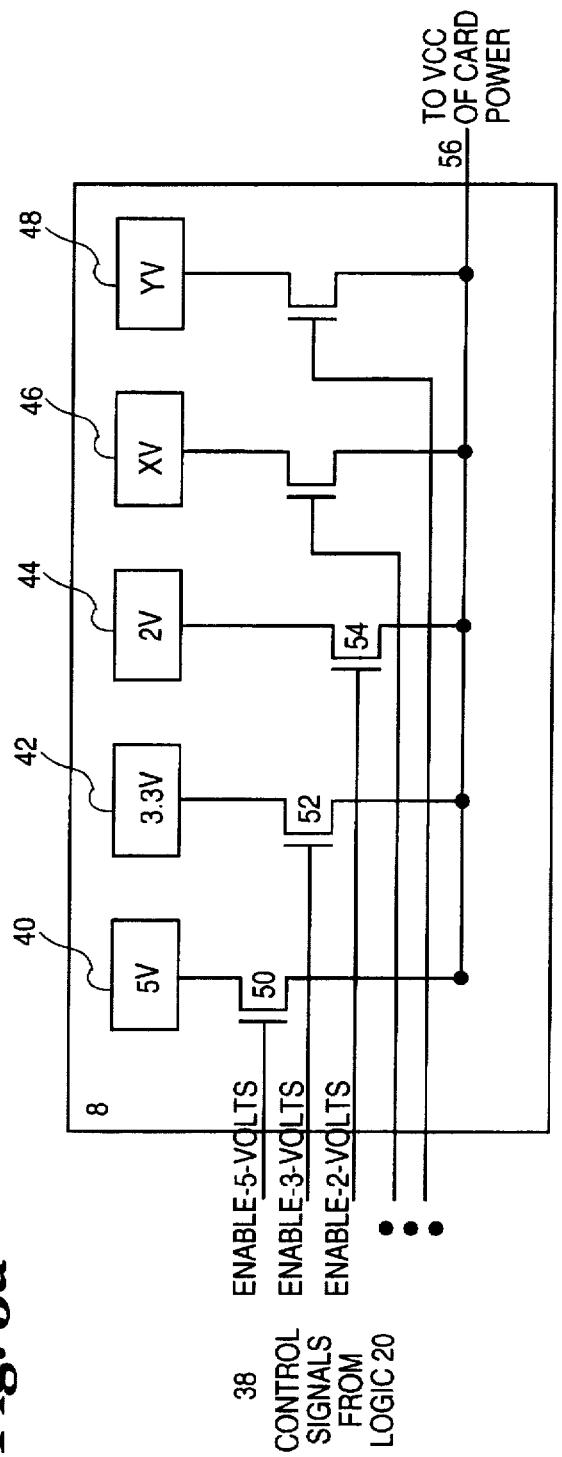
FIG. 3a is a table that assigns acceptable power supply voltages of the removable system resource to digital values.
FIG. 3b is a circuit diagram of the power supply of the host computer system, and the power supply enable signals sent from the power requirement detection and control unit of FIG. 2.

FIG. 3a is a table that assigns acceptable power supply voltages of the removable system resource to digital values. This table of values may be translated into logic equation defining the power supply enable signals. For example, if a 3-bit A/D converter is used, and the digital values are defined as in FIG. 3a, then the following Boolean equations would represent the enable signals controlling the three different power supplies:

$$\text{Enable\_5\_Volts} = \bar{A} \cdot \bar{B} \cdot \bar{C} \cdot \text{ON};$$

$$\text{Enable\_3\_Volts} = \bar{A} \cdot (B \oplus C) \cdot \text{ON};$$

$$\text{Enable\_2\_Volts} = \bar{A} \cdot B \cdot C \cdot \text{ON};$$

$$\text{Power\_Requirement\_Met} = \text{Enable\_5\_Volts} \cdot \text{Enable\_3\_Volts} \cdot \text{Enable\_2\_Volts}$$

Referring again to FIG. 3a, each digital value is assigned a corresponding acceptable power voltage and/or voltages. For example, 000 indicates to the computer system that the removable system resource can only receive a 5 volt power supply. On the other hand, a 010 indicates that any power voltage between 3 volts and 5.5 volts is acceptable to the removable system resource. In the case where the removable system resource can accept a range of power input power supply voltages, the power detection and control unit will supply the removable system resource with the lowest power voltage within that range to conserve power.

The present invention not only indicates the acceptable power voltages that a removable system resource can accept, but also indicates the type of signalling that is acceptable to the removable system resource. For example, FIG. 3a shows 3 signalling levels (i.e., the standard TTL signalling, the low volt CMOS signalling, and also GTL signalling). These signalling standards and conventions are well known in the prior art.

The enable signals (Enable_5_Volts, Enable_3_Volts, Enable_2_Volts) represent the control signals 38 that are issued from logic block 20 and are inputs into system power supply 8, as shown in FIG. 3b.

In FIG. 3b, element 40 represents the 5 volt power supply, and element 42 represents a 3.3 volt power supply. Likewise, element 44 represents a 2 volts power supply, and elements 46 and 48 represent the X volt power supply and the Y voltage power supply respectively. X and Y are voltage values that will be defined in the future. It should be noted that the number of different power supplies can vary depending on the needs and requirement of the host computer system and the removable system resource.

It should be apparent from the above example that the Boolean equations specifying the enable signals will vary depending on how the various bit patterns are defined, the number of different power requirements, the number of different types of signalling, and the number of bits in the A/D converter chosen. Changing any of these parameters will lead to different Boolean equations. However, once the digital bits are given a value and defined and the corresponding logic equations are generated, it is well known in the art how to translate these Boolean equations into logic components to supply the necessary enable signals to the power supply.

The present invention may include a programmable power supply capable of generating an arbitrary voltage within a given range. Logic block 20 may be adapted to generate appropriate signals to control such a programmable power supply, that will directly generate the required voltage.

There will be instances when the host computer system 1 will be unable to supply the power voltage requirements of the removable system resource 4. In such an instance, Power_Requirement_Met will be high, indicating that the host computer system 1 cannot meet the power supply requirement of the removable system resource. Power_Requirement_Met is sent to the host/system removable resource adapter 2. The adapter in turn notifies the user via software that the host computer system 1 cannot supply the power supply requirements of the removable system resource 4. For example, software can be used to print a message onto the screen of a monitor notifying the user of the situation. If the host computer system is equipped with a mechanism to automatically eject the PCMCIA card, then the Power_Requirement_Met signal can be sent to this automatic eject mechanism to signal it to eject the PCMCIA card. In any event, when a signal Power_Requirement_Met is high, no power is supplied to the system removable resource thereby avoiding damage to the removable resource.

For simplicity and clarity, in FIG. 2, the power requirement detection and control unit is shown to be coupled between the host/removable system resource adapter 2 and the removable system resource 4. In a preferred embodiment, the power requirement detection and control unit may be implemented within the host/removable system resource adapter 2. Those elements within the power requirement detection and control unit 10 may be implemented as part of the Application Specific Integrated Circuit (ASIC) that embodies the host/removable system resource adapter 2. Incorporating the power requirement detection and control unit into the removable system resource adapter 2 minimizes both the number of pins used by the removable system resource and the number of pins/inputs used on the adapter (i.e., only one pin is necessary). Even if the power requirement detection control unit 10 is implemented as a separate circuit from the host/removable system resource adapter 2, the number of pins used on the removable system resource is still minimized. In other words, although up to N pins are required to receive the output of the A/D converter on the ASIC, the number of pins on this removable system resource is reduced to one pin. For example, the Card Bus specification utilizes four pins from the PCMCIA card to perform the same function as the present invention.

Figure 4:
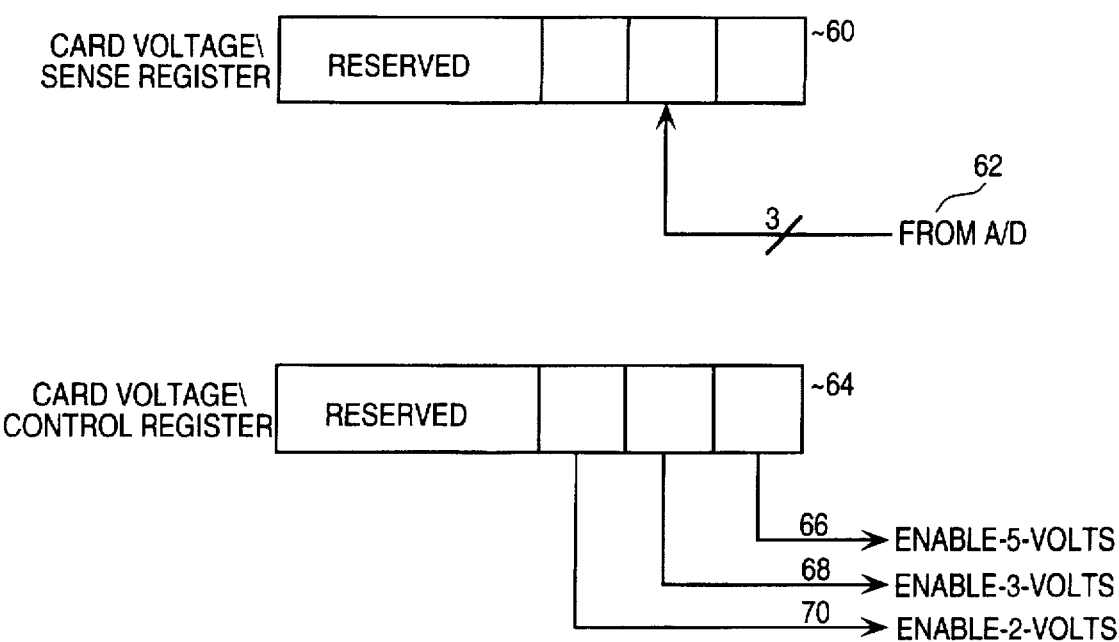
FIG. 4 is an illustration of how this present invention can be used in conjunction with software to notify the user that the system cannot provide the power requirement of a removable system resource.

In another embodiment, instead of using logic block 20, one may take the output of the A/D converter 22 and generate the power enable signals using software. Referring to FIG. 4, one may write the n bit output 62 from the A/D converter into a Card Voltage Sense Register 60. Once those bits are written into the Card Voltage Sense Register 60, the CPU may read those bits and generate the necessary enable signals by performing the logic equations via software. Once the enable signals are generated, the CPU may write the enable signals (signal 66, 68 and 70) to a Card Voltage Control Register 64 which can be used to control the system power supply. These registers 60, 64 reside in the host/removable system resource adapter 2 (i.e., PCMCIA socket). These registers are visible to and may be manipulated by a system programmer. In other words signals 66, 68 and 70 would be equivalent to the control signal 38 in the first embodiment. Specifically, signals 66, 68 and 70 represent Enable_5_Volts, Enable_3_Volts and Enable_2_Volts respectively.

FIGS. 5–8 show an alternative embodiment of this invention. FIG. 5a illustrates a pattern 74 including contact pads 80, and a ground pad 78. Together the contact pads 80 and the ground pad 78 make up a pattern 74 that is applied to the protective casing 72 of the removable system resource.

Figure 5C:
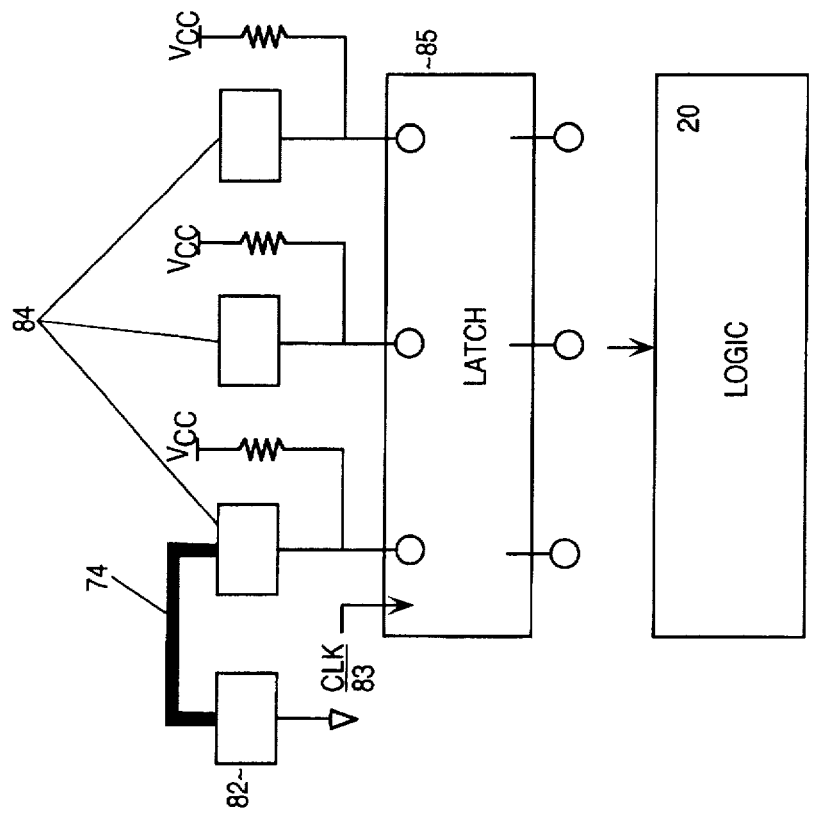
FIG. 5c is a circuit diagram of the power requirement detection and control unit in accordance with a second preferred embodiment of the invention.
Figure 5A:
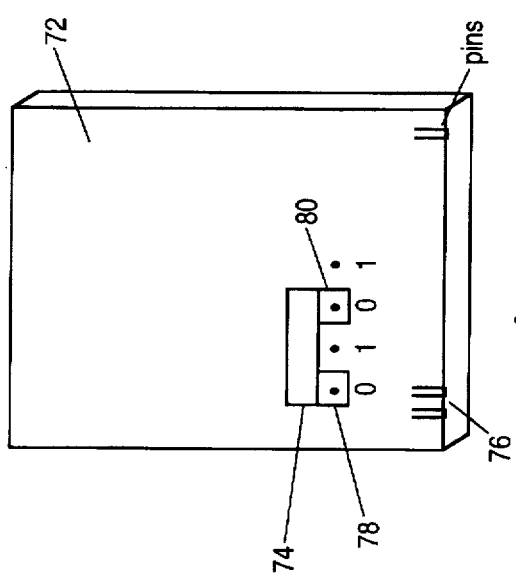
FIGS. 5a and 5b are illustrations of how the removable system resource is physically configured in accordance with a second embodiment of the invention.
Figure 5B:
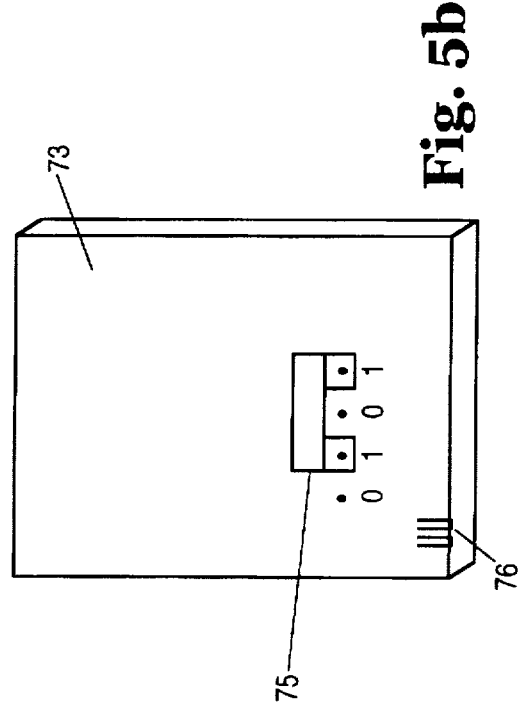
Figure 6A:
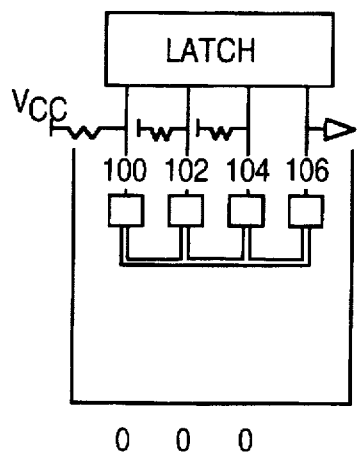
FIGS. 6a–6h illustrates the different patterns on the casing of a removable system resource and the corresponding digital signal that each pattern would generate when in contact with the power requirement detection and control unit.
Figure 6B:
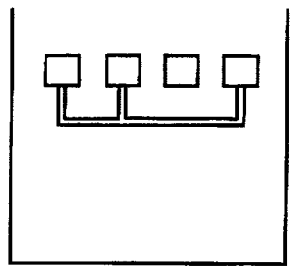
Figure 6C:
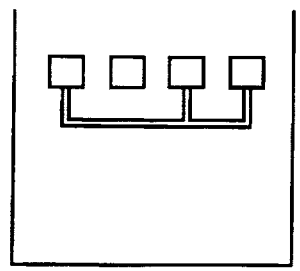
Figure 6D:
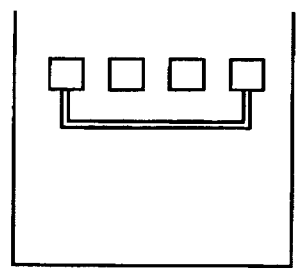
Figure 6E:
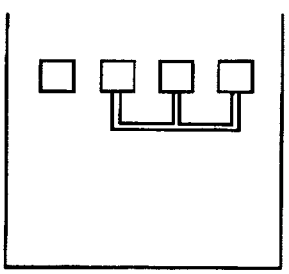
Figure 6F:
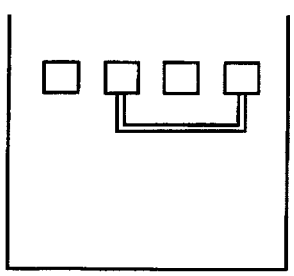
Figure 6G:
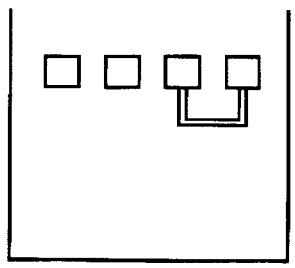
Figure 6H:
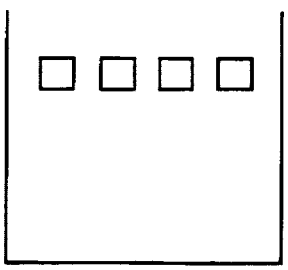

For example, in FIG. 5a the pattern 74 may be a conductive material painted onto or etched onto a non-conductive protective casing 72 of a PCMCIA card. Referring to FIG. 5b, if the casing 73 of the removable system resource is made of a conductive material, then a non-conductive pattern 75 may be stenciled onto the casing 73. This second embodiment is especially conducive for add-in cards having a specified area on the protective casing of the card. For example, on a PCMCIA card, this pattern may be applied to the reserved area of the protective case. In the case of a PC board, where there is no protective case, the pattern may be applied to the fiberglass. Thus, a pattern comprising contact pads 80 and a ground pad 78, may be made of a non-conductive material on a conductive casing/background or a conductive material on a non-conductive casing/background.

FIG. 5c illustrates the electrical diagram for the wipers located within the host computer system that will come into contact with the pads on the removable system resource when the removable system resource 72 is coupled to the host computer system. Wiper 82 is always connected to ground. Upon contact with ground pad 78, both wiper 82 and ground pad 78 will be approximately at the ground potential. All others wipers 84 are connected through a pull-up register to $V_{cc}$. Thus, the wipers 84 are at a high potential (i.e., a logical high) in the following situations:

1) When the removable system resource is not coupled to said host computer system;

2) When the removable system resource is coupled to said host computer system, but there is no segment connecting the ground pad 78, which is near ground potential, to one of the other contact pads 80.

In other words, unless there is a path to ground established by a segment connecting one of the contact pads 80 to the ground contact pad 78, the wipers 84 will output a logical high to latch 85. Latch 85 serves to latch the digital signal created by the wiper circuit according to system clock 83. The digital word that is placed in the latch is then sent to logic block 20.

The output of latch 85 is sent as input signals 32 to logic block 20 in FIG. 2. In other words, in this second embodiment, the wiper circuitry and latch replace the A/D converter, R1, R2, and C of the first embodiment.

FIGS. 6a–6h shows how different patterns produce different corresponding digital signals. Wiper 106 is always coupled to ground. Wiper 100 represents the most significant bit of the 3 bit digital signal, and wiper pad 104 represents the lowest significant bit. Wipers 101, 102 and 104 will remain at a logic high state unless the contact pads which are in contact with wipers 101, 102, 104 are connected with the ground pad by a segment.

FIG. 7 illustrates how the wipers 120 engage the contact pads and the ground pad. The wipers 120 are positioned to make contact with the protective casing 72 of the removable system resource as it is inserted into the system. The wipers 120, housed inside the PCMCIA card receiving slot, are designed to bend and provide sufficient normal force to maintain electrical contact and drag across the surface of the contact pads as the card is inserted to help remove any non-conductive deposit, such as oxides or dust that may have accumulated on the contacts or wipers. The exact positioning of the wipers on the card would need to be standardized but would preferably be positioned, so that the wipers may be implemented as a part of a connector socket itself.

This embodiment is particularly advantageous in that it utilizes no bits, input or pins on the removable system resource.

The number of wipers required would depend on the number of different voltages defined by the industry and supported by the host computer system. For example, 5 wipers: (4 bit values and 1 wiper connected to ground) would be more than adequate for implementing the table shown in FIG. 3a.

The description of the logic block 20, as well as the software implementation of logic block 20 remain the same in this embodiment as in the first embodiment.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. In a computer system having an adapter, said adapter providing an interface between a removable system resource and said computer system a method for selectively providing a power voltage acceptable to said removable system resource, said method comprising the steps of:
   a) generating a first signal indicating a power supply voltage that is acceptable to said removable system resource;
   b) converting said first signal into a plurality of second signals;
   c) receiving a third signal indicating that the removable system resource is fully inserted in said adapter; and
   d) selectively providing an acceptable power voltage or no power voltage to said removable system resource based upon said second signals, and said third signal; wherein the step of selectively providing an acceptable power voltage or no power voltage to said removable system resource includes the step of supplying the lowest acceptable power voltage to said removable system resource if more than one power voltage is acceptable to said removable system resource.

2. The method as claimed in claim 1, wherein the step of generating a first signal further includes the step of:
   establishing a voltage representing an analog signal; and
   wherein the step of converting said first signal into a plurality of second signals further includes the step of converting said voltage into a plurality of voltage values representing a corresponding digital signal.

3. The method as claimed in claim 1, wherein the step of generating a first signal further comprises the steps of:
   a) applying a voltage to a conductive pattern on the removable system resource;
   b) detecting a plurality of voltage signals representing a digital signal from said pattern on the removable system resource; and
   c) latching said digital signal.

4. The method as claimed in claim 1, wherein the step of selectively providing an acceptable power voltage or no power voltage to said removable system resource further comprises the step of:
   generating a plurality of control signals based on the second signals and the third signal, said control signals selecting the appropriate power voltage of the power supply to be applied to said removable system resource.

5. The method of claim 1 further comprising the step of:
   providing the adapter with a signal indicating that the power requirements of the removable system resource has been met, if an acceptable power supply voltage is provided by the computer system to the removable system resource.

6. The method as claimed in claim 1, wherein the first signal further indicates acceptable signaling levels for said removable system resource; said method further comprising the step of:
   providing acceptable signaling levels to said removable system resource based on said second signals if an acceptable power voltage is available from the computer system.

7. In a computer system having a power supply, and an adapter, said adapter providing an interface between a removable system resource and said computer system through a system bus, said power supply providing power to said computer system and said removable system resource, a power requirement detection and control unit coupled to said adapter and said removable system resource comprising:
   a) means for detecting a first signal, said first signal indicating a power voltage acceptable to said removable system resource, and converting said first signal into a plurality of second signals; wherein said detection and conversion means includes an analog to digital converter, said analog to digital converter converting said first signal into said plurality of second signals, said second signals representing a digital value; said analog to digital converter including an input coupled to a first resistor, and a second resistor disposed on said removable system resource, said first resistor and second resistor employed to generate the first signal; and
   b) logic means coupled to said system power supply and said adapter, said logic means receiving said second signals and a third signal indicating whether said removable system resource is fully inserted to said adapter, said logic means based on said second signals and third signal selectively enabling a power voltage acceptable to said removable system resource.

8. The apparatus as claimed in claim 7, wherein said logic means generates a signal to said adapter, said signal indicating to said adapter whether or not said computer system was able to provide an acceptable power voltage to said removable system resource.

9. In a computer system having an adapter, said adapter providing an interface between a removable system resource and said computer system, a method for supplying a power voltage acceptable to said removable system resource comprising the steps of:

a) generating a first signal indicating the power supply voltage is acceptable to said removable system resource;

b) converting said first signal into a plurality of control signals for controlling said system power supply;

c) supplying an acceptable power voltage to said removable system resource upon a first predetermined condition; and d) supplying no power voltage to said removable system resource upon a second predetermined condition; wherein said second predetermined condition is an incompatibility between power voltages acceptable to said removable system resource and the available power voltages of said system power supply.

* * * * *